(12) United States Patent
Tanaka

(10) Patent No.: US 6,217,994 B1
(45) Date of Patent: Apr. 17, 2001

(54) PAINT COMPOSITIONS AND METAL SHEET COATED THEREWITH

(75) Inventor: Shoichi Tanaka, Chigasaki (JP)

(73) Assignee: Kansai Paint Co., Ltd., Hyogo-ken (JP)

( * ) Notice: Subject to any disclaimer, the term of this patent is extended or adjusted under 35 U.S.C. 154(b) by 0 days.

(21) Appl. No.: 09/085,053

(22) Filed: May 27, 1998

(30) Foreign Application Priority Data

May 29, 1997 (JP) .................................................. 9-139449

(51) Int. Cl.[7] .................................................. C09D 167/02
(52) U.S. Cl. ........................... 428/220; 428/458; 428/460; 427/327; 427/385.5; 427/409; 525/443; 525/519
(58) Field of Search .................... 525/443, 519; 428/220, 458, 460; 427/327, 385.5, 409

(56) References Cited

U.S. PATENT DOCUMENTS 4,634,738 * 1/1987 Santer .................................. 525/162
5,681,890 * 10/1997 Tanaka ................................. 524/539

FOREIGN PATENT DOCUMENTS 0669382   8/1995   (EP) .

* cited by examiner

Primary Examiner—Patricia A. Short
(74) Attorney, Agent, or Firm—Wenderoth, Lind & Ponack, L.L.P.

(57) ABSTRACT

This invention provides a paint composition which comprises a film-forming resin component comprising from 65 to 95 parts by weight of a hydroxyl-containing polyester resin (A) having a number average molecular weight of from 1,500 to 35,000, a glass transition temperature of from −30° C. to 60° C. and a hydroxyl value of from 3 to 100 mg KOH/g; and 5–35 parts by weight of a melamine resin crosslinking agent (B) which is a methylolated melamine resin whose methylol groups are alkyl etherified, at least 20% of the total number of methylol groups therein having been etherified with a $C_6$–$C_{12}$ alkyl group; and (C) 0.1 to 2.0 parts by weight, per 100 parts by weight of the total resin component, of a curing catalyst. The paint composition excels in popping resistance, and can form paint film of favorable hardness, formability, curability (solvent resistance) and adhesion.

18 Claims, No Drawings

PAINT COMPOSITIONS AND METAL SHEET COATED THEREWITH

This invention relates to a polyester resin-based paint composition which is capable of forming paint film of favorable hardness, formability, curability and adhesion, exhibits high resistance to pinholes, and enables thick layer coating; in particular, relates to a paint composition suitable to be applied to produce precoat-painted steel sheet; and relates also to coated metal sheets onto which the paint composition was applied.

Conventionally, as finish paint for precoated steel sheet for use as a construction material or for into processing furnitures, coating compositions in which ployester resins are used as the base and a methyl etherified and/or butyl etherified methylolated melamine resin or blocked polyisocyanate compound is blended as crosslinking agent, are frequently used because of their well balanced properties such as hardness, processability and the like. However, they are subject to such a problem that the dry thickness of the finish paint film normally is no more than 20 $\mu$m, because baking of the paint film in the occasion of finish painting precoated sheet steel is conducted at high temperatures for a short time, and when the thickness exceeds said limit, popping occur due to foaming in the film. If thick film can be formed without popping, such thick film is advantageous in respect of durability properties such as corrosion resistance, weather resistance and the like. Thus, a paint composition capable of forming a thick film by single application has been in demand.

The object of the present invention is to provide a polyester resin-based paint composition which is capable of forming a paint or coating film of favorable hardness, formability, curability and adhesion; exhibits high resistance to popping and enables thick layer painting.

We have discovered that the above object can be achieved by a polyester resin-based paint composition in which, as a crosslinking agent, a methylolated melamine resin, which has been etherified with a specific alkyl group, and a curing catalyst are combined with a specific polyester resin, and whereupon completed the present invention.

Namely, the present invention provides a paint composition which is characterized by comprising a film-forming resin component which comprises (A) a hydroxyl-containing polyester resin having a number average molecular weight of from 1,500 to 35,000, a glass transition temperature of from −30° C. to 60° C. and a hydroxyl value of from 3 to 100 mg KOH/g 65–95 parts by weight (B) a melamine resin crosslinking agent which is a methylolated melamine resin whose methylol groups have been alkyl etherified, at least 20% of the total number of methylol groups having been etherified with a $C_6$–$C_{12}$ alkyl group 5–35 parts by weight and (C) 0.1–2.0 parts by weight of a curing catalyst, per 100 parts by weight of total sum of said resin component.

The invention also provides coated metal sheet which is characterized by being coated with the above-specified paint composition on a metal sheet, with or without a primer film therebetween, in such a manner that the thickness of the cured paint film ranges from 21 to 40 $\mu$m.

The paint composition of the present invention is explained in further details hereinafter.

Polyester Resin (A):

Polyester resin (A) which is the main constituent of the film-forming resin component in the composition of the present invention is a polyester resin containing hydroxyl groups, examples of which including oil free polyester resin, oil modified alkyd resin, their modifications, e.g., urethane modified polyester resin, urethane modified alkyd resin, epoxy modified polyester resin, acryl modified polyester resin, and the like.

Said oil free polyester resin is composed of a polycondensation product of a polybasic acid component and polyhydric alcohol component. As the polybasic acid component, one or more dibasic acids selected from, for example, phthalic anhydride, isophthalic acid, terephthalic acid, tetrahydrophthalic anhydride, hexahydrophthalic anhydride, succinic acid, fumaric acid, adipic acid, sebacic acid and maleic anhydride; and their reactive derivatives such as lower alkyl esters thereof, are mainly used, and if necessary monobasic acid such as benzoic acid, crotonic acid, p-t-butylbenzoic acid or the like and trivalent or higher polybasic acid such as trimellitic anhydride, methylcyclohexene tricarboxylic acid, pyromellitic anhydride, and the like, are concurrently used. As the polyhydric alcohol component, dihydric alcohol such as ethylene glycol, diethylene glycol, propylene glycol, 1,4-butanediol, neopentyl glycol, 3-methylpentanediol, 1,4-hexanediol, 1,6-hexanediol and the like are mainly used, and if necessary trihydric or higher alcohol such as glycerin, trimethylolethane, trimethylolpropane, pentaerythritol and the like can be concurrently used. These polyhydric alcohols can be used either singly or as mixtures of more than one kind. Esterification or ester interchange reaction of the two components can be conducted by the means known per se. As the acid component, isophthalic acid, terephthalic acid, and lower alkyl esters of these acids are particularly preferred.

A hydroxyl-containing oil free polyester resin can be obtained through a polycondensation reaction of the polybasic acid component with a polyhydric alcohol component at such a ratio, eg., that the hydroxyl groups in the polyhydric alcohol component become excessive to the carboxyl groups (an acid anhydride group is calculated as two carboxyl groups, as done throughout in this specification) in the polybasic acid component.

Oil modified alkyd resin is formed by reacting, in addition to said polybasic acid component and polyhydric alcohol component of above oil free polyester resin, an oil fatty acid by a method known per se. Examples of usable oil fatty acid include coconut oil fatty acid, soy bean oil fatty acid, linseed oil fatty acid, safflower oil fatty acid, tall oil fatty acid, dehydrated castor oil fatty acid and tung oil fatty acid. It is generally preferred to keep the oil length in the alkyd resin to be not more than 30%, in particular, within a range of 5 to 20%.

Hydroxyl-containing oil modified alkyd resin can be obtained, for example, by reacting the three components at such ratios that the hydroxyl groups in the polyhydric alcohol component become excessive to the total carboxyl groups in the polybasic acid component and the oil fatty acid.

As urethane modified polyester resin, one formed by reacting above-described oil free polyester resin or a low molecular weight oil free polyester resin which has been formed by reacting the acid component and the alcohol component used in the occasion of making the oil free polyester resin, with a polyisocyanate compound by a method known per se. Said urethane modified alkyd resin, furthermore, encompasses reaction products of said alkyd resin or a low molecular weight alkyd resin which has been obtained by reacting the named components used in the occasion of making the alkyd resin, with a polyisocyanate compound by a method known per se. As examples of polyisocyanate compound useful in the occasion of making said urethane modified polyester resin and urethane modified alkyd resin include hexamethylene diisocyanate, isophorone diisocyanate, xylylene diisocyanate, tolylene diisocyanate, 4,4'-diphenylmethane diisocyanate, 4,4'-methylenebis (cyclohexylisocyanate) and 2,4,6-triisocyanatotoluene. As the urethane modified polyester resin and alkyd resin, generally those whose extent of modification is such that the amount of the polyisocyanate compound forming the urethane modified resin is not more than 30% by weight, in particular, 2 to 10% by weight, to the urethane modified resin, are preferred.

Hydroxyl-containing urethane modified polyester resin and hydroxyl-containing urethane modified alkyd resin can be prepared by, for example, having a low molecular weight oil free polyester or alkyd resin which is to be reacted with polyisocyanate compound contain hydroxyl groups in advance by aforesaid means, and reacting such low molecular weight oil free polyester resin or alkyd resin with a polyisocyanate compound under such quantitative conditions that the hydroxyl groups in the reactant should become excessive to the isocyanate groups in the polyisocyanate compound.

As epoxy modified polyester resin, addition, condensation or grafting reaction products of oil free polyester resin with epoxy resin, such as a reaction product of carboxyl groups in an oil free polyester resin prepared in the above-described manner, or a product in which hydroxyl groups in the oil free polyester resin are bound to hydroxyl groups in an epoxy resin via a polyisocyanate compound, may be named. Generally preferred degree of modification for those epoxy modified polyester resins is such that the amount of an epoxy resin to the epoxy modified polyester resin ranges from 0.1 to 30% by weight, in particular, from 5 to 20% by weight.

The above-described reaction products may contain secondary hydroxyl groups formed upon a ring-opening addition reaction between carboxyl and/or hydroxyl groups of a polyester resin and epoxy groups in the epoxy resin. Introduction of primary hydroxyl groups into such an epoxy modified polyester resin can be effected, for example, by having the polyester resin and/or epoxy resin to be used as the reactants contain primary hydroxyl groups in advance, and reacting the resins under such conditions that at least a part of said primary hydroxyl groups should remain intact in the reaction product.

As acryl modified polyester resin, for example, reaction products of oil free polyester resin prepared as above with acrylic resin having groups reactive with carboxyl groups or hydroxyl groups in the oil free polyester resin, examples of such reactive groups being carboxyl, hydroxyl and epoxy groups; or reaction products formed through graft polymerization of (meth)acrylic acid, (meth)acrylic acid esters, etc. to said oil free polyester resin aided by a peroxide type polymerization initiator. Generally preferred degree of modification of such acryl modified polyester resin is that the amount of the acrylic resin to the acryl modified polyester resin ranges from 0.1 to 30% by weight, in particular, from 5 to 20% by weight.

Of the above-described polyester resin, the especially preferred is oil free polyester resin.

According to the present invention, such polyester resins as above-described, having a number average molecular weight of from 1,500 to 35,000, preferably from 3,000 to 25,000; a glass transition temperature (Tg point) of from −30° to 60° C., preferably from −25° to 45° C., in particular, from −20 to 35° C.; and a hydroxyl value of from 3 to 100 mg KOH/g, preferably from 5 to 85 mg KOH/g, in particular, from 8 to 70 mg KOH/g, are used as polyester resin (A).

In the present invention, the glass transition temperature (Tg) is determined by differential thermal analysis (DTA), and the number average molecular weight is measured by means of gel permeation chromatography (GPC), using calibration curve of standard polystyrene.

Melamine Resin Crosslinking Agent (B):

According to the present invention, as a crosslinking agent to be blended in the paint composition, a melamine resin crosslinking agent capable of reacting with said polyester resin (A) to cure said resin (A) is used.

As such melamine resin crosslinking agent (B), in particular, a methylolated melamine resin obtained through a reaction of melamine with aldehyde, whose methylol groups are further alkyl etherified is used, at least 20% of total number of methylol groups therein being etherified with $C_6$–$C_{12}$ alkyl groups. As useful $C_6$–$C_{12}$ alkyl groups, for example, n-hexyl, 2-ethylbutyl, n-octyl, 2-ethylhexyl, decyl, dodecyl and the like may be used. In particular, 2-ethylhexyl and decyl are preferred in respect of favorable popping resistance and ease of manufacture.

It is preferred that the number of alkyl etherified methylol groups in above melamine resin crosslinking agent (B) is at least 50%, in particular, at least 80%, of total number of methylol groups. Furthermore, a part of the methylol groups may be alkyl etherified with alkyl group(s) other than $C_6$–$C_{12}$ alkyl groups, such as lower alkyl groups containing 5 carbon atoms or less, eg., methyl, ethyl, propyl, n-butyl, isobutyl, amyl, etc., n-butyl, isobutyl and amyl being preferred from the viewpoint of favorable pinhole resistance. Degree of etherification with such lower alkyl groups may be no more than 80%, preferably no more than 50%, of the total number of alkyl etherified methylol groups. Said alkyl etherification of methylol groups can be effected, for example, by etherifying the methylol groups with an alkanol having a prescribed kind of alkyl groups, or through an ether exchange reaction of etherified methylol groups with an alkanol having a prescribed kind of alkyl groups.

Said methylolated melamine resin may be either a mononuclear substance having single melamine ring or a polynuclear substance containing two or more melamine rings, or may be a mixture thereof. Normally those having number average molecular weights within a range of 450–3000, in particular, 800–2000, are preferred.

In the paint compositions of the present invention, polyester resin (A) and melamine resin crosslinking agent (B) are present within the following ranges in terms of weight part, and are blended at the ratios as will make the total 100 parts by weight:

polyester resin (A):
  65–95, preferably 70–90 parts by weight melamine resin crosslinking agent (B):
  5–35, preferably 10–30 parts by weight.

Curing Catalyst (C):

Curing catalyst (C) is blended into the paint composition of the present invention to promote the reaction between polyester resin (A) and melamine resin crosslinking agent (B).

As curing catalyst (C), acid catalysts are used, in particular, sulfonic acid compounds or amin-eneutralized products of sulfonic acid compounds being preferred. Typical examples of useful sulfonic acid compound include alkyl aromatic sulfonic acid such as p-toluenesulfonic acid, dodecylbenzenesulfonic acid, dinonylnaphthalenesulfonic acid and dinonyinaphthalenedisulfonic acid. As the amine to form the amine-neuralized product of sulfonic acid compound, any of primary, secondary and tertiary amines can be used. Of these, from the viewpoint of stability of the paint composition, the reaction-promoting effect and physical properties of resulting paint film, amine-neutralized product of p-tolunesulfonic acid and/or that of dodecylbenzenesulfonic acid are preferred.

Such curing catalyst (C) is blended at a ratio within a range of 0.1–2.0, preferably 0.2–1.5, parts by weight, per 100 parts by weight in total of the film-forming resin component comprising polyester resin (A) and melamine resin crosslinking agent (B). In the present invention, the quantity of curing catalyst (C) signifies that of the sulfonic acid compound excluding amine, when the catalyst is an amine-neutralized product of a sulfonic acid compound. Similarly, when the catalyst is an amine-neutralized product of other acid compound, the quantity of the catalyst signifies that of the acid compound, excluding the amine in the curing catalyst.

Other Additives

While the coating compositions of the present invention are composed substantially of polyester resin (A), melamine resin crosslinking agent (B) and curing catalyst (C), if necessary they may further contain such additives as a lubricant; inorganic delusterant; organic solvent; coloring pigment, brightening pigment such as aluminum powder, copper powder, nickel powder, titanium oxide-coated mica powder, iron oxide-coated mica powder and bright graphite; fine granular or fine fibriformed resins such as fluorinated resin, e.g., vinylidene polyfluoride, polytetrafluoroethylene and the like, silicone resin, polypropylene, polyamide, phenolic resin, acrylic resin and the like; defoaming agent known per se to be used for paint compositions; and paint film surface-regulating agent.

The lubricant is subject to no specific restriction so long as it is capable of imparting lubricity to paint film surface, and any of lubricants already known in the field of paint can be used. Typical examples include polyolefin wax such as polyethylene wax; modified silicone oil such as polyether modified silicone oil, higher fatty acid ester modified silicone oil and higher alkoxy modified silicone oil; paraffin wax such as microcrystalline wax; and fatty acid ester wax such as montan wax, lanolin wax, carnauba wax, beeswax and whale wax. Of those, polyethylene wax is preferred.

As the inorganic delusterant, any of inorganic delusterants used in the field of paint can be optionally used. For an example, fine silica powder is useful.

Said organic solvent is blended when individual occasions demand, for improving application property of the paint compositions of the present invention, which needs to be capable of dissolving or dispersing the polyester resin (A), melamine resin crosslinking agent (B) and curing catalyst (C). Specific examples of usable solvent include: hydrocarbon solvent such as toluene, xylene and high boiling point petroleum hydrocarbons; ketone solvent such as methyl ethyl ketone, methyl isobutyl ketone, cyclohexanone and isophorone; ester solvent such as ethyl acetate, butyl acetate, ethylene glycol monoethyl ether acetate and diethylene glycol monoethyl ether acetate; alcoholic solvent such as methanol, ethanol, isopropanol and butanol; and ether alcoholic solvent such as ethylene glycol monoethyl ether, ethylene glycol monobutyl ether and diethylene glycol monobutyl ether. They may be used either alone or as mixtures. Use of such organic solvent having a boiling point not lower than 150° C. is advantageous in respect of popping resistance of the paint film.

Said coloring pigment which can be optionally used may be those normally used in the field of paint, for example, white pigment such as titanium white and zinc flower; Cyanine Blue, Cyanine Green, organic red pigment such as azo dyes and quinacridone dyes; organic yellow pigments such as of benzimidazolone, isoindolinone, isoindoline and quinophthalone type; and inorganic coloring pigment such as titanium yellow, red iron oxide, carbon black, chrome yellow and various calcined pigments.

Formulation of the Paint Compositions

The paint compositions of the present invention can be prepared by homogeneously mixing above-described polyester resin (A), melamine resin crosslinking agent (B), curing catalyst (C) and suitable additive(s), following customary paint formulation method known per se. More specifically, when a particular paint composition contains pigment, a mixture of, for example, polyester resin (A), solvent and the pigment is dispersed in a pigment disperser such as a paint shaker, and thereafter the remaining constituent components are added thereto, followed by further mixing to provide a paint composition.

Paint Application

Paint compositions in accordance with the present invention excel in hardness, processability, curability, solvent resistance and adhesion of paint films thereof, and can be applied onto various materials such as metal sheet, plastics and sheet glass or the like, either directly or via a primer film.

The compositions of the present invention also excel in pinhole resistance, and can form with ease dry paint film of 21 $\mu$m or even greater thickness, without causing any pinhole occurrence, even under high temperature-short time baking conditions, for example, 60 seconds baking to attain the maximum temperature of the paint film (PMT) of 220° C. In consequence, it allows ready formation of paint film having a dry thickness of 21 $\mu$m or more by single application, in the field of metal sheet, in particular, in finish-painting precoated sheet steel where high temperature-short time baking of the top paint film is practiced and formation of 21 $\mu$m or thicker dry paint film has been difficult.

Thus, according to the present invention, coated metal sheet on which cured film of a paint composition of the present invention having a dry thickness of 21 $\mu$m or more is formed directly or via a primer film is provided.

As the metal sheet to be applied with the paint composition, for example, cold rolled steel sheet, zinc plated steel sheet, aluminum sheet and the like may be named. In particular, zinc plated steel sheet can be conveniently used. Examples of zinc plated steel sheet include: hot dipped galvanized steel sheet, zinc electroplated steel sheet, iron-zinc alloy plated steel sheet, nickel-zinc alloy plated-steel sheet and aluminum-zinc alloy plated steel sheet (eg., those commercialized under tradenames of "GALVALIUM" and "GALFAN"), and chemically pretreated zinc plated steel sheet prepared by subjecting these zinc plated steel sheet to such chemical pretreatment as zinc phosphate treatment, chromate treatment or the like.

A primer is optionally applied and baked on above metal sheet as individual occasions demand, and then a paint composition of the present invention is applied and baked. The primer is subject to no critical limitation so long as it is one used for manufacture of precoated steel sheet, examples of which including epoxy resin-based and polyester resin-based primers. Thickness of the primer film is not critical, while it normally and conveniently is around 2 to 10 $\mu$m as a dry film thickness.

Said epoxy resin-based primer contains an epoxy resin as the chief resin component, which if necessary is blended with a crosslinking agent such as an amino resin, polyisocyanate compound or the like. Whereas, a polyester resin-based primer contains as the chief resin component a polyester resin or a modified polyester resin such as an epoxy- or urethane-modified polyester resin, which is if necessary blended with a crosslinking agent such as amino resin, polyisocyanate compound and the like to constitute the resin component. Those primers may contain if necessary such additives, besides the resin component, pigment(s), organic solvent and other paint additive(s).

The application method of a paint composition of the present invention onto the primer film or onto directly a metal sheet is subject to no specific limitation. It can be conducted by, for example, roll coating, curtain coating, dipping, spraying or the like. Convenient film thickness so applied is normally within a range, in terms of dry thickness, of 21–40 μm, in particular, 23–35 μm.

Curing conditions of the paint compositions of the present invention can be suitably selected among baking conditions to cure paint, according to the kinds of polyester resin and crosslinking agent present in individual composition. Whereas, in case of coil coating for continuous application by, for example, roll coating, of a continuously moving long metal plate, normally preferred conditions are 15–90 seconds with the paint's maximum temperature (PMT) of 160–260° C., in particular, 30–70 seconds with PMT of 190–240° C.

Hereinafter the present invention is explained more specifically, referring to Examples, in which parts and percentages are by weight.

EXAMPLES 1–11 AND COMPARATIVE EXAMPLES 1–8

Formulation of Paint Compositions

Top paint compositions were prepared through formulation of the blends of the composition as indicated in later appearing Table 1.

The quantities of the polyester resins and melamine resin crosslinking agents as indicated in Table 1 are by weight of the solids, and those of the curing catalysts are, when they are sulfonic acid compounds, expressed by weight as converted to the respective sulfonic acid compound. In the occasion of formulating the paint compositions, titanium white which is a white pigment was dispersed. A solvent mixture of cyclohexanone/Solvesso 200 ("Solvesso 200" is an aromatic, petroleum-derived high temperature-boiling solvent manufactured by Esso Oil Co. Ltd. Both cyclohexanone and Solvesso 200 have a boiling point not lower than 150° C.)=40/60 (by weight ratio) was used, eg., for adjusting viscosity of the paint. In the occasion of applying those paints, their viscosity was adjusted to about 90 seconds (25° C.) as measured with Ford cup No. 4.

Preparation of Test Panels

On a chromate-treated, 0.5 mm-thick electrolytic zinc-plated steel sheet, KP Color 8630 primer (produced by Kansai Paint Co., Ltd., an epoxy-modified polyester primer for pre-coated steel sheet, the primer film having a Tg point of 52° C.) was applied to a dry film thickness of about 4 μm, and baked for 30 seconds under the conditions such that the maximum temperature attained by the material became 220° C. Onto so obtained primer-coated steel sheet, each of the paints as obtained in the Examples and Comparative Examples was applied with a bar coater to a dry film thickness of 25 μm, 30 μm or 35 μm, and baked for 45 seconds under such conditions that the maximum temperature attained by the material became 220° C. to give top coated steel sheet which was subjected to various tests as follows. All the tests excepting the popping resistance test were given to the sample sheet with a 25 μm-thick dry top coat film. The results of the tests are given in said Table 1.

The tests indicated in Table 1 were conducted by the following methods.

Test Methods

Popping Resistance:

As to the top film coated on the primer-coated steel sheet to the varied dry thicknesses of 25 μm, 30 μm and 35 μm, number of popping formed by foaming, each within an area of 50×50 mm , was visually counted. Depending on the number of poppings, the top coated steel sheet samples were graded by the following standard:

⊚: No popping was observed.

○: Less than 5 poppings were observed.

Δ: At least 5 but less than 20 poppings were observed.

X : At least 20 poppings were observed.

Pencil Hardness:

The top coated steel sheet samples were given the pencil hardness test as prescribed by JIS K-5400 8.4.2 (1990) and evaluated according to the same JIS.

Bending Processability:

Each sample sheet was bent by 180° with the top coated surface outside, in a room of 20° C., and T number at which no crack was formed at the bent portion was visually counted and indicated. Here the "T number" refers to a number of a plate of the same thickness with that of the tested sample, which was(were) inserted inside the bent portion of the tested sample. That is, when nothing was inserted between the 180° bent portion of a tested sample, the indication is "0T"; when one such plate was inserted, "1T"; when two plates were inserted, "2T"; . . . and when n plates were inserted, the indication is "nT".

Solvent Resistance:

In a room of 20° C., each test sample was placed under reciprocating motion, within a length of about 5 cm, of a piece of gauze impregnated with methyl ethyl ketone, exerting a load of about 1 kg/cm on the top coated surface. The number times of the reciprocating motion made until the underneath primer-coated surface became visible was recorded. When the primer-coated surface was still invisible after 50 reciprocating motions, the indication is 50<. The more the number times of the reciprocating motion, the better the curability of the coated film.

Adhesion:

Following the cross-cut-tape method as prescribed by JIS K-5400 8.5.2 (1990), eleven each longitudinal and lateral straight lines were orthogonally incised on the surface of the top coat or paint film on each test sample, in parallel at a regular interval of 1 mm with a cutter knife to the full thickness of the film, to form 100 1 mm×1 mm squares. A cellophane adhesive tape was adhered to the incised surface, and then abruptly removed. The number of squares on which the paint film remained unpeeled was observed and adhesion of the coating film was evaluated according to the following standard:

○: No peeling of paint film was observed.

Δ: Paint film slightly peeled off but at least 90 squares remained unaffected.

X: Substantial part of the paint film came off and less than 90 squares remained unaffected.

The test results are indicated in Table 1 below.

TABLE 1

| | Example | | | | | | | | | | | Comparative Example | | | | | | | |
|---|---|---|---|---|---|---|---|---|---|---|---|---|---|---|---|---|---|---|---|
| Example No. | 1 | 2 | 3 | 4 | 5 | 6 | 7 | 8 | 9 | 10 | 11 | 1 | 2 | 3 | 4 | 5 | 6 | 7 | 8 |
| Polyester resin | | | | | | | | | | | | | | | | | | | |
| Vylon KS-1590V (*1) | 85 | 85 | 85 | | | | | 85 | 85 | 85 | | 85 | 85 | 85 | 85 | | 96 | 60 | |
| Vylon KS-1860V (*2) | | | | 70 | | | | | | | 80 | | | | | | | | 80 |
| Vylon KS-1450V (*3) | | | | | 85 | | | | | | | | | | | | | | |
| Vylon KS-1520V (*4) | | | | | | 90 | | | | | | | | | | | | | |
| Vylon KS-1470V (*5) | | | | | | | 85 | | | | | | | | | | | | |
| Vylon 35CS (*6) | | | | | | | | | | | | | | | | 85 | | | |
| Melamie resin cross-linking agent | | | | | | | | | | | | | | | | | | | |
| melamine resin a (*7) | 15 | | | | | | | | | 15 | | | | | | | | | |
| melamine resin b (*8) | | 15 | | | 15 | | 15 | | | | | | 15 | | 15 | | 15 | 4 | 40 |
| melamine resin c (*9) | | | 15 | 30 | | 10 | | | | | | | | | | | | | |
| melamine resin d (*10) | | | | | | | | 15 | | | 20 | | | | | | | | 20 |
| melamine resin e (*11) | | | | | | | | | 15 | | | | | | | | | | |
| melamine resin f (*12) | | | | | | | | | | | | | | | | 15 | | | |
| Cymel 303 (*13) | | | | | | | | | | | 15 | | | | | | | | |
| Super Beckamin J-820-60 (*14) | | | | | | | | | | | | | | | 15 | | | | |
| Curing catalyst | | | | | | | | | | | | | | | | | | | |
| Nacure 5225 (*15) | 0.6 | 0.6 | 0.6 | 1.0 | 0.6 | 0.4 | 0.6 | 0.6 | | | 0.8 | 0.6 | | | 0.6 | 0.6 | 0.2 | 1.5 | |
| Nacure 2500X (*16) | | | | | | | | | 0.6 | 0.6 | | | | | | | | | |
| Tipaque CR-95 (*17) | 90 | 90 | 90 | 90 | 90 | 90 | 90 | 90 | 90 | 90 | 90 | 90 | 90 | 90 | 90 | 90 | 90 | 90 | 90 |
| Test item | | | | | | | | | | | | | | | | | | | |
| popping resistance | | | | | | | | | | | | | | | | | | | |
| 25 μm | ◎ | ◎ | ◎ | ◎ | ◎ | ◎ | ◎ | ◎ | ◎ | ◎ | ◎ | X | ◎ | X | ○ | ◎ | ◎ | ○ | ◎ |
| 30 μm | ◎ | ◎ | ◎ | ◎ | ◎ | ◎ | ◎ | ◎ | ◎ | ◎ | ◎ | X | ◎ | X | X | ◎ | ◎ | Δ | ◎ |
| 35 μm | ○ | ◎ | ◎ | ○ | ◎ | ○ | ○ | ○ | ◎ | ○ | ○ | X | ◎ | X | X | ◎ | ◎ | X | ◎ |
| pencil hardness | 3H | 3H | 3H | 3H | 3H | 3H | 3H | 3H | 3H | 3H | 3H | 3H | HB | 3H | 3H | HB | HB | 3H | HB |
| bending processability | 0T | 0T | 0T | 0T | 0T | 1T | 3T | 0T | 0T | 0T | 0T | 0T | 0T | 2T | 0T | 0T | 0T | 4T | 0T |
| solvent resistance | 50< | 50< | 50< | 50< | 50< | 50< | 50< | 50< | 50< | 50< | 50< | 50< | 5 | 50< | 50< | 10 | 20 | 50< | 15 |
| adhesion | ○ | ○ | ○ | ○ | ○ | ○ | ○ | ○ | ○ | ○ | ○ | ○ | ○ | ○ | ○ | ○ | ○ | ○ | ○ |

TABLE 2

|  | number average molecular weight | glass transition temp. Tg (° C.) | hydroxyl value (mg/KOH/g) |
|---|---|---|---|
| Vylon KS-1590V | 9,000 | 3 | 12 |
| Vylon KS-1860V | 32,000 | −8 | 17 |
| Vylon KS-1450V | 26,500 | 6 | 5 |
| Vylon KS-1520V | 6,400 | 2 | 42 |
| Vylon KS-1470V | 13,000 | 35 | 13 |
| Vylon 350S | 23,000 | 7 | 2.5 |

Those (*7) to (*12) melamine resin crosslinking agents in Table 1 were the melamine resins in which substantially all methylol groups were alkyl etherified, having the properties as indicated in Table 3 below.

TABLE 3

|  | Kind and Proportion of Alkylether Groups | Number Average Molecular Weight of Melamine Resin |
|---|---|---|
| melamine resin a | methyl/2-ethylhexyl = 20/80 | 1,200 |
| melamine resin b | n-butyl/2-ethylhexyl = 35/65 | 1,300 |
| melamine resin c | methyl/n-decyl = 40/60 | 1,300 |
| melamine resin d | n-butyl/2-ethylhexyl = 80/20 | 1,200 |
| melamine resin e | n-butyl/2-ethylhexyl = 35/65 | 1,800 |
| melamine resin f | methyl/2-ethylhexyl = 85/15 | 480 |

(*13) Cymel 303: Mitsui Cytec Co., Ltd., a low molecular weight, methyl etherified melamine resin, containing at least 60% by weight of hexaquis(methoxymethyl)melamine.
(*14) Super Beckamin J-820-60: Dainippon Ink and Chemicals, Inc., a n-butyl etherified melamine resin.
(*15) Nacure 5225: King Industries Co., Ltd. (USA), a solution of amine-neutralized product of dodecylbenzene-sulfonic acid, which is a curing catalyst.
(*16) Nacure 2500X: King Industries Co., Ltd. (USA), a solution of amine-neutralized product of p-toluenesul-fonic acid, which is a curing catalyst.
(*17) Tipaque CR-95: Ishihara Sangyo Kaisha, Ltd., a titanium white pigment.

What is claimed is:

1. A paint composition comprising a film-forming resin component which comprises
   (A) a hydroxyl-containing polyester resin having a number average molecular weight of from 1,500 to 35,000, a glass transition temperature of from −30° C. to 60° C. and a hydroxyl value of from 3 to 100 mg KOH/g 65–95 parts by weight and
   (B) a melamine resin crosslinking agent which is a methylolated melamine resin whose methylol groups have been alkyl etherified, at least 20% of the total number of methylol groups having been etherified with $C_6$–$C_{12}$ alkyl group and degree of etherification with alkyl group(s) other than $C_6$–$C_{12}$ alkyl group being no more than 50% of the total number of alkyl etherified methylol groups 5–35 parts by weight and
   (C) 0.1–2.0 parts by weight, per 100 parts by weight of total sum of said resin component, of a curing catalyst.

2. The composition of claim 1 in which the hydroxyl-containing polyester resin (A) is a hydroxyl-containing oil-free polyester resin.

3. The composition of claim 1 in which the hydroxyl-containing polyester resin (A) has a number average molecular weight of from 3,000 to 25,000.

4. The composition of claim 1 in which the hydroxyl-containing polyester resin (A) has a glass transition temperature of from −20° C. to 35° C.

5. The composition of claim 1 in which the hydroxyl-containing polyester resin (A) has a hydroxyl value of from 8 to 70 mg KOH/g.

6. The composition of claim 1 in which the melamine resin crosslinking agent (B) is a methylolated melamine resin with at least 80% of the total number of methylol groups therein having been alkyl etherified.

7. The composition of claim 1 in which the melamine resin crosslinking agent (B) is a methylolated melamine resin whose methylol groups have been etherified with 2-ethylhexyl group or decyl group.

8. The composition of claim 1 in which the melamine resin crosslinking agent (B) is an alkyl etherified methylolated melamine resin having a number average molecular weight of from 450 to 3,000.

9. The composition of claim 1 in which the film-forming resin component is composed of 70 to 90 parts by weight of the hydroxyl-containing polyester resin (A) and 10 to 30 parts by weight of the melamine resin crosslinking agent (B).

10. The composition of claim 1 in which the curing catalyst is a sulfonic acid compound or an amine-neutralized product of sulfonic acid compound.

11. The composition of claim 10 in which the sulfonic acid compound is an alkyl aromatic sulfonic acid.

12. The composition of claim 1 in which the curing catalyst is an amine-neutralized product of p-toluene-sulfonic acid, an amine-neutralized product of dodecyl-benzenesulfonic acid or a mixture of the two.

13. The composition of claim 1 which contains 0.2–1.5 parts by weight of the curing catalyst per 100 parts by weight of the total sum of the film-forming resin component.

14. A coating method which is characterized in that the composition of claim 1 is applied onto a material to be coated, either directly or through a primer film.

15. The method of claim 14 in which the material to be coated is metal sheet.

16. The method of claim 14, in which the composition is applied to provide a cured paint film of at least 21 μm in thickness.

17. A coated metal sheet which is characterized by being coated with the paint composition of claim 1 either directly or through a primer film, in such a manner that the thickness of the cured paint film ranges from 21 to 40 μm.

18. A coated metal sheet of claim 17 in which the metal sheet is a zinc-plated steel sheet.

* * * * *